Patented Oct. 25, 1932

1,884,709

UNITED STATES PATENT OFFICE

RUSSELL L. JENKINS, OF ANNISTON, ALABAMA, AND JAMES F. NORRIS, OF CAMBRIDGE, MASSACHUSETTS, ASSIGNORS TO SWANN RESEARCH, INC., A CORPORATION OF ALABAMA

POROUS SILICA CATALYST AND METHOD OF PREPARING THE SAME

No Drawing.   Application filed October 22, 1928.   Serial No. 314,319.

Our invention relates to catalysts, particularly to porous silica catalysts, and has for its object the production of such a catalyst which shall have a high order of catalytic activity.

A further object of our invention is to provide a method of preparing a porous silica catalyst from insoluble metallic silicates whereby a silica skeleton is formed, and wherein said silica skeleton is impregnated with metallic salts or compounds which we have found to be especially effective as catalyzing agents in association with the silica skeleton.

More specifically, the object of our invention is to provide a silica skeleton catalyst made from serpentine and which shall have associated therewith certain mineral salts or compounds which greatly increase the order of catalytic activity of the silica skeleton, together with an improved method of preparing the catalyst.

It is known that the commercial variety of silica gel is an active catalyst in certain catalytic processes. It is also known that in order to enhance the catalytic activity of ordinary silica gel, or in order to lend special catalytic properties to it, silica gel has been impregnated during manufacture, as by mixing either catalytic materials or materials which may readily be converted to catalytic materials with the silica sol prior to the setting of the sol to a gel, for example, see U. S. Patents to Patrick, No. 1,577,186, and 1,577,187. Variations of this procedure have been employed, which consist essentially in introducing the catalytic material at different stages of the process of manufacture of the silica gel.

We have found by experiment that porous silica skeletons may be prepared as shown below so as to retain small quantities of impurities and when so prepared have valuable catalytic properties and these catalytic properties may be enhanced or new catalytic properties added by impregnating the silica skeletons with other catalytic materials. The weight of catalytic materials residual in the silica skeletons as prepared or added thereto during manufacture is relatively small compared to the total weight of the skeletons. The purpose for which these silica skeletons are useful depends largely on the materials used to impregnate the porous silica skeletons.

Silica skeletons are distinctly different from silica gels, both in the ease of manufacture and in certain physical properties during manufacture, and as a finished product. For example, in the manufacture of silica skeletons certain water insoluble silicates are treated with mineral acids until the silicate has completely or nearly completely reacted with said acids to give a metallic salt or salts and a residue of silica which we prefer to designate as a porous silica skeleton. These porous silica skeletons are of approximately the same size and shape as the original pieces of silicate, and have a relatively firm or rigid structure as compared with that of a silica gel just after setting. The silica skeleton so produced is then washed with water to remove soluble salts, and is dried. After washing and prior to drying, the skeleton contains a weight of water roughly equal to its weight when dried, instead of several times that weight as is the case with silica gel after washing and prior to drying. Furthermore, during drying, a silica skeleton undergoes very little if any change in volume whereas on drying silica gel, which has been allowed to set and then been washed, the volume of the soft wet gel is many times that of the finished dried product.

In our experiments with silica skeletons we have found in their preparation that if not too completely leached they contain small amounts of substances, which substances, in some cases, cause the skeletons to be more active and valuable catalysts. An example of this is the skeleton from serpentine, which, if not too completely leached, retains small quantities of certain substances, among them cobalt, which actively promote the reaction of steam with monochlorobenzene in the vapor phase.

As a preferred method of carrying out our invention, we proceed as follows:—Serpentine, a mineral of the general composition, $H_4Mg_3Si_2O_9$, is crushed to the desired particle size, and is placed in a vessel through which a solution of 6 normal sulfuric acid is circulated, either hot or cold, but preferably at 60°–80° C., until substantially all of the magnesium in the silicate has been converted into sulphate. The silica skeleton remaining is washed free of the soluble magnesium salts and then slowly dried at about 100° to 110° C.

The silica skeleton, formed as just described, is then just covered with an aqueous solution of cupric chloride containing .00005 gram-moles of cupric chloride per gram of skeleton. The mixture is evaporated to dryness at 100° to 110° C., with frequent stirring of the skeleton and the solution so as to give more even distribution of the salt.

Another method of preparing the catalyst is to soak the silica skeleton, formed as previously described, in a solution of cobaltous chloride, draining the liquor off and then slowly drying it at around 110° C. The cobaltous chloride solution is of such concentration that when the catalyst is dried, the skeleton retains approximately .0005 gram-moles of cobaltous chloride per gram of skeleton. This concentration is roughly 1.25% of $C_oCl_2.7H_2O$.

A still further example of carrying out our invention is to mix the silica skeleton with an equal weight of an aqueous solution of magnesium chloride containing .0005 gram-moles of magnesium chloride per gram of skeleton. The mixture is then evaporated to dryness at 100° to 110° C.

While we have described several ways of carrying out our invention, it will be obvious to those skilled in the art that it is not so limited but is susceptible of various other changes and modifications without departing from the spirit thereof and we desire therefore that only such limitations shall be placed thereupon as are imposed by the prior art or as are specifically set forth in the appended claims.

What we claim is:

1. A porous silica skeleton catalyst formed of serpentine from which acid soluble substances have been largely but not entirely removed, and impregnated with a metallic catalyzing agent.

2. A porous silica skeleton catalyst formed of serpentine from which acid soluble substances have been largely but not entirely removed, and impregnated with cupric chloride.

3. A porous silica skeleton catalyst formed of serpentine from which acid soluble substances have been largely but not entirely removed, and impregnated with cupric chloride, there being approximately .00005 moles of cupric chloride per gram of skeleton.

4. The method of preparing a porous silica skeleton catalyst which comprises leaching with acid a water insoluble metallic silicate until the acid soluble substances in the silica have been largely but not entirely removed, and soaking the skeleton so formed in a cupric chloride solution of such strength that, when dried, the skeleton retains approximately .00005 moles of cupric chloride per gram of skeleton.

5. A porous silica skeleton catalyst formed from serpentine from which acid soluble substances have been largely but not entirely removed, and impregnated with cobaltous chloride.

6. The method of preparing a porous silica skeleton catalyst which comprises leaching serpentine until the acid soluble substances in the silicate have been largely but not entirely removed, and associating with the skeleton so formed a metallic catalyzing agent.

7. The method of preparing a porous silica skeleton catalyst which comprises leaching serpentine until the acid soluble substances in the silicate have been largely but not entirely removed, and impregnating the skeleton so formed with cupric chloride solution.

In testimony whereof we affix our signatures.

RUSSELL L. JENKINS.
JAMES F. NORRIS.